US012565210B2

(12) United States Patent
    Ryberg et al.

(10) Patent No.: US 12,565,210 B2
(45) Date of Patent: Mar. 3, 2026

(54) SYSTEM AND METHOD FOR CONTROLLING A POWERTRAIN SYSTEM OF A VEHICLE

(71) Applicant: VOLVO TRUCK CORPORATION, Gothenburg (SE)

(72) Inventors: Henrik Ryberg, Gothenburg (SE); Markus Schellenberger, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/176,392

(22) Filed: Apr. 11, 2025

(65) Prior Publication Data

US 2025/0319872 A1 Oct. 16, 2025

(30) Foreign Application Priority Data

Apr. 15, 2024 (EP) ..................................... 24170275

(51) Int. Cl.
    *B60W 30/18* (2012.01)
    *B60W 10/02* (2006.01)
    *B60W 10/06* (2006.01)

(52) U.S. Cl.
    CPC ...... *B60W 30/18072* (2013.01); *B60W 10/02* (2013.01); *B60W 10/06* (2013.01);
    (Continued)

(58) Field of Classification Search
    CPC ... B60W 30/18072; B60W 2030/1809; B60W 10/02; B60W 10/06; B60W 2552/20;
    (Continued)

(56) References Cited

U.S. PATENT DOCUMENTS

| | | | |
|---|---|---|---|
| 10,119,488 B2 | 11/2018 | Roos et al. | |
| 10,166,986 B2 | 1/2019 | Theel et al. | |

(Continued)

FOREIGN PATENT DOCUMENTS

| | | |
|---|---|---|
| DE | 102016009325 A1 | 2/2017 |
| JP | 2015051646 A | 3/2015 |
| WO | 2012169961 A1 | 12/2012 |

OTHER PUBLICATIONS

Extended European Search Report in corresponding European Application No. 24170275.2 dated Oct. 29, 2024 (10 pages).

*Primary Examiner* — Huan Le

(74) *Attorney, Agent, or Firm* — Jeffri A. Kaminski; Venable LLP

(57) ABSTRACT

A computer system for controls a powertrain system of a vehicle. The computer system has processing circuitry to operate the powertrain system in a freewheeling mode, in which an output shaft of an engine is non-rotating, and the engine is disconnected from one or more drive wheels. The processing circuitry determines an opportunity for the freewheeling mode by predicting a feasibility of restarting the engine along an intended route by using a controllable clutch. Predicting the feasibility of restarting the engine by using the controllable clutch includes determining fulfillment of any one of a first restarting condition and a second restarting condition. The powertrain system is controlled into the freewheeling mode upon the fulfillment of any one of the first restarting condition and the second restarting condition.

14 Claims, 3 Drawing Sheets

(52) U.S. Cl.
CPC .............. *B60W 2030/1809* (2013.01); *B60W 2510/1005* (2013.01); *B60W 2520/26* (2013.01); *B60W 2530/10* (2013.01); *B60W 2552/20* (2020.02); *B60W 2552/40* (2020.02); *B60W 2710/021* (2013.01); *B60W 2710/06* (2013.01)

(58) Field of Classification Search
CPC ..... B60W 2552/40; B60W 2510/1005; B60W 2520/26; B60W 2530/10; B60W 2710/21; B60W 2710/06
See application file for complete search history.

(56) References Cited

U.S. PATENT DOCUMENTS

| | | | | |
|---|---|---|---|---|
| 10,407,064 | B2 * | 9/2019 | Lee ........................ | B60W 10/06 |
| 10,479,359 | B2 * | 11/2019 | Ose ........................ | B60W 10/10 |
| 10,875,534 | B2 * | 12/2020 | Maruyama .......... | B60W 10/107 |
| 2014/0114542 | A1 | 4/2014 | Abdul-Rasool et al. | |

* cited by examiner

SYSTEM AND METHOD FOR CONTROLLING A POWERTRAIN SYSTEM OF A VEHICLE

TECHNICAL FIELD

The disclosure relates generally to the field of controlling a powertrain system of a vehicle, while the vehicle is moving, and, more specifically, to an automatically controlled powertrain system for vehicles. In particular aspects, the disclosure relates to a computer system, powertrain system, vehicle and methods for controlling an engine of a vehicle, while the vehicle is moving. The disclosure can be applied to any type of vehicle, including heavy-duty vehicles, such as trucks, buses, and construction equipment, among other vehicle types. Although the disclosure may be described with respect to a particular vehicle, the disclosure is not restricted to any particular vehicle.

BACKGROUND

Conventional internal combustion engine vehicles operate continuously when the engine is running, even when idling at traffic lights, stuck in traffic, or during extended periods of inactivity. This constant engine operation results in unnecessary fuel consumption and increased emissions, contributing to environmental pollution and increased fuel costs for vehicle owners. To address these issues, various stop and start technologies have been developed, such as engine idle stop-start systems, which shut off the engine when the vehicle is stationary and automatically restart it when the driver releases the brake or engages the accelerator.

In recent years, there has been a growing demand for more sophisticated and intelligent engine stop-and-start systems for heavy-duty vehicles that can adapt to a wider range of driving conditions. The development of automatic and predictive engine stop-and-start systems addresses these challenges by incorporating predictive algorithms, real-time data sources, and advanced control strategies. Automatic and predictive engine stop-and-start systems aim to provide smoother, more efficient, and less intrusive engine stop-and-start experiences for drivers while increasing fuel savings and emissions reduction.

However, in connection with the use of such systems in a vehicle, such as a heavy-duty vehicle, there is still a need for further improving the operations of the powertrain system, while the vehicle is moving.

SUMMARY

According to a first aspect of the disclosure, there is provided a computer system for controlling a powertrain system of a vehicle. The powertrain system comprises an internal combustion engine connectable to one or more drive wheels. The computer system comprises processing circuitry configured to selectively operate the powertrain system in a number of operational modes, comprising at least a freewheeling mode, in which an output shaft of the engine is non-rotating, and the engine is disconnected from the one or more drive wheels. The processing circuitry is further configured to determine an opportunity for the freewheeling mode by predicting a feasibility of restarting the engine along an intended route by using a controllable clutch, wherein predicting the feasibility of restarting the engine by using the controllable clutch comprises determining fulfillment of any one of a first restarting condition and a second restarting condition, wherein determining fulfillment of the first restarting condition comprises comparing current total weight of the vehicle with a threshold value indicative of a minimum total weight for avoiding excessive braking of the vehicle during restarting at a high friction road condition with a given total gear ratio, wherein determining fulfillment of the second restarting condition comprises comparing a current drive axle load with a corresponding threshold value indicative of a minimum drive axle load for avoiding excessive wheel slip on a drive axle during restarting at a low friction road condition with a given total gear ratio; and control the powertrain system into the freewheeling mode upon the determined fulfillment of any one of the first restarting condition and the second restarting condition.

The first aspect of the disclosure may seek to determine the suitability of using the freewheeling mode under varied driving conditions, while ensuring a reliable and safe engine restart using the clutch when exiting the freewheeling mode. Given the varying driving conditions, it is difficult to ascertain whether the road will be rough or slippery where the engine restart with the clutch will occur. Therefore, the proposed computer system considers one or more restarting conditions to determine whether the engine can be shut down in the freewheeling mode.

The first restarting condition considers the total weight of the vehicle to safeguard that an acceptable comfort is perceived if the restart would occur on a high-friction road surface, such as a rough road surface. A high-friction road surface, e.g. a rough surface, typically refers to a physical state of a surface defined by irregularities, unevenness, and texture. One example of a high-friction surface is asphalt. The purpose of using such restarting condition is thus to avoid, or at least reduce excessive deceleration, which typically causes poor comfort. In the context of the first restarting condition it can be noted that a large braking torque on the drive wheel(s) may be acceptable if the Gross Combination Weight (GCW) is relatively high, since the resulting deceleration would not be significantly high.

The second restarting condition assesses the pressure on the drive axle to prevent excessive slip of the drive wheels, which can occur if the engine restarts under slippery road conditions. Excessive slip on the drive wheel(s) poses a risk of skidding for the vehicle, which may typically prevent the engine from being restarted with the clutch. The aim of this condition is thus to avoid excessive drive wheel slip. In the context of the second restarting condition it can be noted that a large braking torque on the drive wheel(s) may also be acceptable on slippery road conditions if the drive axle pressure is high, since this would minimize, or at least reduce wheel slip.

The values used for these calculations are typically based on assumptions regarding the friction on typically high-friction road surfaces, e.g. rough road surfaces, and typically low-friction road surfaces, e.g. slippery road surface.

A technical benefit may include enhanced precision in managing engine restarts during vehicle motion by evaluating one or more engine restarting conditions.

Optionally in some examples, including in at least one preferred example, the processing circuitry may be configured to predicting the feasibility of restarting the engine by using the controllable clutch by determining fulfillment of both the first restarting condition and the second restarting condition, and further configured to control the powertrain system into the freewheeling mode upon the determined fulfillment of both the first restarting condition and the second restarting condition. As such, these restarting conditions are considered independent from each other, and both need to be fulfilled; that is, both restarting conditions must be met to allow a freewheeling mode, in which an output shaft of the engine is non-rotating, typically corresponding to an engine shutdown. To this end, two independent restarting conditions are predicted by the proposed computer system. The total weight needs to exceed the calculated threshold for total weight, and the drive axle pressure needs to surpass the calculated corresponding threshold for drive axle pressure. Both restarting conditions must also be satisfied to allow entering the freewheeling mode. In this manner, the proposed computer system allows for the activation of the freewheeling mode only when both restarting conditions are satisfied, thereby controlling the activation of the freewheeling mode based on desired comfort and safety for the engine restart when exiting the freewheeling mode.

Accordingly, the computer system compares the current total weight of the vehicle against a predetermined threshold, ensuring minimal excessive deceleration during restarts on potentially high friction surfaces with a specific gear ratio. Concurrently, the computer system assesses the drive axle load relative to a defined minimum to prevent excessive wheel slip on potentially low friction surfaces with a specific gear ratio.

Optionally in some examples, including in at least one preferred example, the processing circuitry may be configured to control the powertrain system into the freewheeling mode by changing a rotating state of the output shaft to a non-rotating state, and disconnecting the engine from the one or more drive wheels. A technical benefit may include providing improved fuel efficiency and decreased wear on engine components over time.

Optionally in some examples, including in at least one preferred example, the processing circuitry may further be configured to initiate activation of the freewheeling mode based on topography data and vehicle data. A technical benefit may include providing a more precise activation of the freewheeling mode so as to further enhance fuel savings, while minimizing, or at least reducing the risk of disruptions to the driving experience.

Optionally in some examples, including in at least one preferred example, the processing circuitry may further be configured to determine a starting point in time for the freewheeling mode based on topography data and vehicle data. A technical benefit may include further assisting in achieving enhanced fuel efficiency by ensuring that the vehicle takes increased advantage of gravitational forces and inertia during downhill sections of a route.

Optionally in some examples, including in at least one preferred example, the processing circuitry may further be configured to determine the given total gear ratio by predicting which gear is to be engaged at the moment of engine restart. A technical benefit of predicting which gear is to be engaged at the moment of engine restart may include providing a smoother transition between the freewheeling mode and another operational mode of the powertrain system (such as a driving/propulsion mode), which can reduce stress on the powertrain system and improve the overall driving experience. In this context, it should be noted that a perceived discomfort by the user is typically attributed to non-favorable operating conditions of the components making up the powertrain system.

Optionally in some examples, including in at least one preferred example, the gear to be engaged at the moment of engine restart may be predicted based on topography data. Predicting the gear based on topography data allows for determining which gear to be used for the engine restart so as to provide input in determining the minimum total weight and minimum axle pressure.

Optionally in some examples, including in at least one preferred example, the processing circuitry may be configured to determine fulfillment of the first restarting condition by determining that the total weight of the vehicle meets, or exceeds, the threshold value. A technical benefit may include further improving the precision in determining the fulfillment of the first restarting condition.

Optionally in some examples, including in at least one preferred example, the processing circuitry may be configured to determine fulfillment of the second restarting condition by determining that the current drive axle load meets, or exceeds, the corresponding threshold value. A technical benefit may include further improving the precision in determining the fulfillment of the second restarting condition.

Optionally in some examples, including in at least one preferred example, the processing circuitry may be configured to determine non-fulfillment of the first restarting condition and the second restarting condition, respectively; and upon determined non-fulfillment of the first restarting condition and second restarting condition, further determine to avoid, or postpone, controlling the powertrain system into the freewheeling mode. A technical benefit may include improved decision precision. By ascertaining the non-fulfillment of the first restarting condition and the second restarting condition, the computer system may facilitate enhanced and informed decision-making.

Optionally in some examples, including in at least one preferred example, the processing circuitry may be configured to determine non-fulfillment of the first restarting condition and second restarting condition, respectively; and upon the determined non-fulfillment of the first restarting condition and second restarting condition, further determine to restart the engine along the intended route by using a starter motor, rather than the controllable clutch, and control the powertrain system into the freewheeling mode. A technical benefit may include the use of the starter motor for engine restarts as a reasonable alternative for allowing the powertrain system to operate in the freewheeling mode, thus contributing to a relatively fuel-efficient and seamless driving experience.

According to a second aspect of the disclosure, there is provided a powertrain system comprising the computer system according to the first aspect, an internal combustion engine, a controllable clutch, a transmission arranged to be coupled to the internal combustion engine by means of the controllable clutch, and wherein the transmission further comprises an output shaft configured to be coupled to a drive axle of a set of wheels.

The disclosure according to the second aspect may seek to determine the suitability of using the freewheeling mode under varied driving conditions, while ensuring a reliable and safe engine restart using the clutch when exiting the freewheeling mode. Given the varying driving conditions, it is difficult to ascertain whether the road will be rough or slippery where the engine restart with the clutch will occur. Therefore, the proposed computer system considers one or more restarting conditions to determine whether the engine can be shut down in the freewheeling mode. A technical benefit may include enhanced precision in managing engine restarts during vehicle motion by evaluating one or more engine restart conditions.

Typically, the computer system compares the current total weight of the vehicle against a predetermined threshold, ensuring minimal excessive braking during restarts on potentially high friction surfaces with a specific gear ratio. Concurrently, the computer system assesses the drive axle load relative to a defined minimum to prevent excessive wheel slip on potentially low friction surfaces with a specific gear ratio.

Optionally in some examples, including in at least one preferred example, the proposed computer system of the powertrain system allows for the activation of the freewheeling mode only when both restarting conditions are satisfied, thereby controlling the activation of the freewheeling mode based on desired comfort and safety for the engine restart when exiting the freewheeling mode.

According to a third aspect of the disclosure, there is provided a vehicle comprising the computer system of the first aspect and/or a powertrain system according to the second aspect. By way of example, the vehicle is a heavy-duty vehicle.

Optionally in some examples, including in at least one preferred example, the vehicle is an internal combustion engine vehicle (ICEV). An ICEV is a vehicle that relies solely on an internal combustion engine for propulsion, without the assistance of electric motors or fuel cells that are characteristic of hybrid or fully electric vehicles. Optionally in some examples, including in at least one preferred example, the vehicle is a non-electric vehicle. In this context, the term non-electric vehicle refers to a vehicle avoid of any electric storage and power system configured to provide traction power to the vehicle. Such electric storage system may be battery system in combination with an electric machine and/or fuel cell system in combination with an electric machine. In other words, a non-electric vehicle is a vehicle comprising the internal combustion engine as the primary; or the only, power source for the powertrain system. The use of the computer system for controlling a non-electric vehicle, while the vehicle is moving, may be particularly useful where the internal combustion engine is the only available power source for the vehicle.

According to a fourth aspect of the disclosure, there is provided a computer-implemented method for controlling a powertrain system of a vehicle, the powertrain system comprising an internal combustion engine connectable to one or more drive wheels, the powertrain system being operable in a number of operational modes, including at least a freewheeling mode, in which an output shaft of the engine is non-rotating, and the engine is disconnected from the one or more drive wheels, wherein the method comprises determine an opportunity for the freewheeling mode by predicting a feasibility of restarting the engine along an intended route by using a controllable clutch, wherein predicting the feasibility of restarting the engine by using the controllable clutch comprises determining fulfillment of a first restarting condition and a second restarting condition, wherein determining fulfillment of the first restarting condition comprises comparing current total weight of the vehicle with a threshold value indicative of a minimum total weight for avoiding excessive braking of the vehicle during restarting at a high friction road condition with a given total gear ratio, wherein determining fulfillment of the second restarting condition comprises comparing a current drive axle load with a corresponding threshold value indicative of a minimum drive axle load on a drive axle for avoiding excessive wheel slip during restarting at a low friction road condition with a given total gear ratio; and controlling the powertrain system into the freewheeling mode upon the determined fulfillment of the first restarting condition and second restarting condition.

The disclosure according to the fourth aspect may seek to determine the suitability of using the freewheeling mode under varied driving conditions, while ensuring a reliable and safe engine restart using the clutch when exiting the freewheeling mode. Given the varying driving conditions, it is difficult to ascertain whether the road will be rough or slippery where the engine restart with the clutch will occur. Therefore, the proposed computer system considers one or more restarting conditions to determine whether the engine can be shut down in the freewheeling mode. A technical benefit may include enhanced precision in managing engine restarts during vehicle motion by evaluating one or more engine restart conditions.

According to a fifth aspect of the disclosure, there is provided a computer program product comprising program code for performing, when executed by the processing circuitry of the first aspect, the method of the fourth aspect.

According to a sixth aspect of the disclosure, there is provided a non-transitory computer-readable storage medium comprising instructions, which when executed by the processing circuitry of the first aspect, cause the processing circuitry to perform the method of fourth aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

Figure 1:
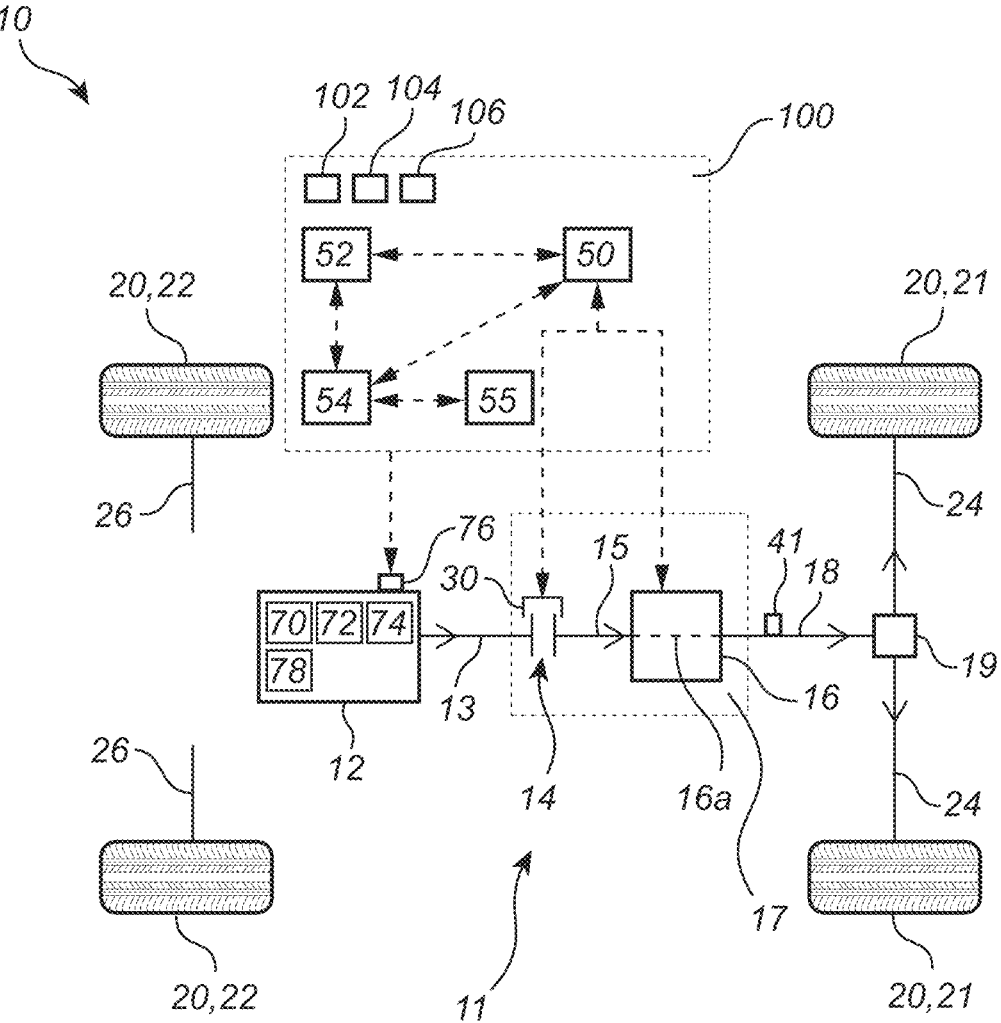
FIG. 1 illustrates an exemplary view of a vehicle comprising a powertrain system and a computer system having a processing circuitry configured to control the powertrain system according to an example.

The detailed description set forth below provides information and examples of the disclosed technology with sufficient detail to enable those skilled in the art to practice the disclosure.

In the field of vehicles, there is an increasing demand for improving the fuel efficiency and reducing emissions of the internal combustion engine (ICE). One operation for enhancing fuel efficiency and lowering emissions in a powertrain system is referred to as freewheeling. Freewheeling is commonly applied in heavy-duty vehicles. The purpose of freewheeling in heavy-duty vehicles is to save fuel and reduce engine load under certain driving conditions. Freewheeling is commonly used when the vehicle is descending downhill or traveling on a slope. There are typically two types of freewheeling modes. In one type of freewheeling operation, the engine is disconnected or disengaged from the driving wheel(s), allowing the vehicle to coast freely (in contrast to a conventional coasting mode). Hereby, the heavy-duty vehicle can take advantage of gravitational forces to maintain or increase speed while consuming minimal fuel. This type of freewheeling operation can be particularly useful for improving fuel efficiency and reducing wear and tear on the braking system during downhill descents. Freewheeling can be engaged manually by the driver or automatically by the vehicle's control system, e.g. as a part of the automatic and predictive engine stop-and-start system. When the driver and/or an automatic vehicle control system initiates freewheeling, the transmission is typically shifted to a neutral or coasting position, decoupling the engine from the drivetrain. In some cases, the engine may idle at a minimal RPM to maintain essential functions like power steering and braking. This mode of operation may be denoted as a freewheeling mode with the engine disconnected.

Freewheeling may also include a specific mode of operation where the engine is typically shutdown (in addition to being disconnected from the driving wheels). More specifically, in the context of the present disclosure, this freewheeling mode refers to an operational mode in which the output shaft of the engine is non-rotating, and the engine is disconnected from the one or more drive wheels. An operational mode where the output shaft of the engine is non-rotating typically signifies that the engine is in a non-active state, such as in a shutdown state, engine off state, standby mode. By way of example, in such freewheeling mode, the engine is thus shutdown, and not engaged with the drivetrain for propulsion. In addition, no fuel is supplied to the engine. For ease of reference, this freewheeling mode is denoted as the engine stop freewheeling mode (ES-FM). The engine stop freewheeling mode refers to a freewheeling mode with the engine shutdown, and disconnected from the drive wheel(s).

Operating the powertrain system in the engine stop freewheeling mode ES-FM contributes to even better fuel consumption and reduced emissions. Additionally, the engine stop freewheeling mode ES-FM allows for quicker attainment of the target speed, as compared to other operational modes, such as the coasting mode, wherein the engine remains connected to the driving wheels. The engine stop freewheeling mode ES-FM thus facilitates more efficient acceleration and speed management, particularly in situations such as downhill driving. As such, prolonging the operation of the powertrain system in the engine stop freewheeling mode ES-FM enables the maintenance of a higher average speed.

The disclosure is at least partly based on the insight that when the engine is to be restarted via the clutch while the vehicle is in motion, i.e., after entering the freewheeling mode, there will be a brief braking torque applied to the drive axles connected to the drive wheel(s). Depending on the condition of the road surface, such braking torque may pose different challenges to the powertrain system and the vehicle. In one situation where the road friction is high, such short braking period may introduce discomfort due to the vehicle characteristics (i.e. the total weight and total gear ratio). In another situation, where the road friction is low, the braking torque could lead to excessive wheel slip, potentially causing vehicle skidding and/or making it impossible to restart the engine. However, there is a challenge in predicting whether the road will be rough or slippery at the point where the engine restarts with the clutch.

The first aspect of the disclosure may seek to determine the suitability of using engine stop freewheeling mode ES-FM under varied driving conditions, while ensuring a reliable and safe engine restart using the clutch when exiting the engine stop freewheeling mode ES-FM. Given the varying driving conditions, it is difficult to ascertain whether the road will be rough or slippery where the engine restart with the clutch will occur. Therefore, the proposed computer system considers one or more restarting conditions to determine whether the engine can be shut down in the engine stop freewheeling mode ES-FM. In one example, these restarting conditions are considered independent from each other, and both need to be fulfilled; that is, both restarting conditions must be met to allow a freewheeling mode, in which an output shaft of the engine is non-rotating, typically corresponding to an engine shutdown. In one example, only the first restarting conditions must be fulfilled. In another example, only the second restarting condition must be fulfilled.

The first restarting condition considers the total weight of the vehicle to safeguard that an acceptable comfort is perceived if the restart would occur on rough road conditions. The purpose of using such restarting condition is thus to avoid, or at least reduce excessive deceleration, which typically causes poor comfort. In the context of the first restarting condition it can be noted that a large braking torque on the drive wheel(s) may be acceptable if the Gross Combination Weight (GCW) is relatively high, since the resulting deceleration would not be significantly high.

The second restarting condition assesses the pressure on the drive axle to avoid the drive wheels from experiencing too much slip should the engine restart occur on slippery road conditions. Excessive slip on the drive wheel(s) poses a risk of skidding for the vehicle, which may typically prevent the engine from being restarted with the clutch. The aim of this condition is thus to avoid excessive drive wheel slip. In the context of the second restarting condition it can be noted that a large braking torque on the drive wheel(s) may also be acceptable on slippery road conditions if the drive axle pressure is high, since this would minimize, or at least reduce drive wheel slip.

To this end, two independent restarting conditions are predicted by the proposed computer system. The total weight needs to exceed the calculated threshold for total weight, and the drive axle pressure needs to surpass the calculated threshold for drive axle pressure. Both restarting conditions must be satisfied to allow entering the engine stop freewheeling mode ES-FM. The values used for these calculations are typically based on assumptions regarding the friction on typically rough and typically slippery road conditions, respectively.

A technical benefit may include enhanced precision in managing engine restarts during vehicle motion by evaluating one or more engine restarting conditions. By way of example, the computer system compares the current total weight of the vehicle against a predetermined threshold. ensuring minimal excessive braking during restarts on potentially high friction surfaces with a specific gear ratio. Concurrently, the computer system assesses the drive axle load relative to a defined minimum to prevent excessive wheel slip on potentially low friction surfaces with a specific gear ratio. In this manner, the proposed computer system allows for the activation of the engine stop freewheeling mode ES-FM only when both restarting conditions are satisfied, thereby controlling the activation of the engine stop freewheeling mode ES-FM based on desired comfort and safety for the engine restart when exiting the engine stop freewheeling mode ES-FM.

One example of a vehicle comprising a powertrains system and a computer system will now be described in relation to a vehicle in the form of a heavy-duty vehicle, such as a truck.

FIG. 1 schematically illustrates an exemplary vehicle 10. The vehicle 10 in FIG. 1 comprises a powertrain system 11. The powertrain system 11 is adapted to power the vehicle 10.

In addition, as depicted in FIG. 1, the vehicle 10 comprises a computer system 100. In this example, the powertrain system 11 comprises the computer system 100. In other examples, the computer system 100 is a separate part of the vehicle, which is configured to be in communication with the powertrain system 11. The computer system 100 may also be a remote server configured to be in communication with the powertrain system 11. The computer system 100 is configured to control the powertrain system 11. The computer system 100 here comprises a processing circuitry 102. The operations of the processing circuitry 102 will be further described herein. In FIG. 1, the computer system 100 also comprises a memory 104 and a system bus 106. These components and further optional technical details of the computer system 100 are described in relation to FIG. 4.

The computer system 100 is configured to selectively operate the powertrain system 11 in a number of operational modes, comprising at least the engine stop freewheeling mode ES-FM. In the engine stop freewheeling mode ES-FM. In the engine stop freewheeling mode ES-FM, the output shaft of the engine is non-rotating, and the engine is disconnected from the one or more drive wheels. For ease of reference, the engine stop freewheeling mode ES-FM will in the following be denoted as the freewheeling mode ES-FM.

Optionally, the computer system 100 is configured to selectively operate the powertrain system 11 in a number of operational modes, comprising the engine stop freewheeling mode ES-FM, an additional freewheeling mode, denoted as an engine disconnected freewheeling mode (ED-FM), in which an output shaft of the engine is rotating, the engine is disconnected from the one or more drive wheels, and fuel is being supplied to the engine; in a coasting mode CM, in which the output shaft of the engine is rotating, the engine is connected to the one or more drive wheels, and fuel supply to the engine is interrupted; and in an engine braking mode EBM, in which the output shaft of the engine is rotating, the engine is connected to the one or more drive wheels, and the engine is operated so as to generate a braking effect.

In addition, the computer system 100 is configured to control an engine restart attempt of the vehicle 10, while the vehicle 10 is moving. The computer system 100 is thus configured to restart the engine 12 of the vehicle 10, while the vehicle 10 is moving.

Turning again to FIG. 1, the powertrain system 11 comprises an internal combustion engine 12. For ease of reference, the internal combustion engine is herein typically denoted as the engine, or sometimes as the ICE. The engine 12 comprises at least one cylinder 74 having a combustion chamber 70 and a reciprocating piston 72. More specifically, the engine 12 comprises a plurality of cylinders 74, each one having a corresponding combustion chamber 70 and a corresponding piston 72 arranged therein.

The powertrain system 11 also comprises a fuel injector 78, as illustrated in FIG. 1. The fuel injector 78 is here an integral part of the engine 12. The fuel injector 78 is configured to inject fuel into the engine 12. The fuel injector 78 may be any suitable type of injector capable of injecting fuel such as a diesel fuel, a gaseous fuel and the like. Typically, the fuel injector 78 is arranged in the cylinder 74, and axially above the piston 72. Each one of the cylinders 74 of the engine 12 comprises a corresponding fuel injector 78. The fuel injector 78 is controllable by the computer system 100. By way of example, the fuel injector 78 is controllable by the processing circuitry 102 of the computer system 100.

The fuel injector 78 is controllable by the processing circuitry 102 of the computer system 100 in order to allow the computer system 100 to switch between the various modes of the powertrain system 11, such as the engine stop freewheeling mode ES-FM, as described herein.

The engine 12 is configured to output a rotational speed via an engine output shaft 13, also referred to as the output shaft of the engine 12, as illustrated in e.g. FIG. 1. Hence, the powertrain system 11 comprises the engine output shaft 13. The engine output shaft 13 can either be in a rotating state or in a non-rotating state. When the engine output shaft 13 rotates, the engine 12 is typically turned on, while when the engine output shaft 13 is non-rotating, the engine 12 is typically shutdown.

The engine 12 is typically also configured to operate in a conventional four stroke fashion, i.e. operated by an intake stroke, a compression stroke, a combustion stroke, and an exhaust stroke. In this example, the engine is an internal diesel combustion engine, i.e. an engine designed to work according to the diesel process. By way of example, the engine 12 is a compression ignition internal combustion engine. The engine 12 may also be provided in other types of configurations or be operated by other types of fuels. The components of an engine are well-known, and thus not further described herein.

The powertrain system 11 here also comprises a starter motor 76. The starter motor 76 is here an integral part of the engine 12. Alternatively, the starter motor 76 is operatively connected to the engine 12 to allow the starter motor 76 to crank the engine 12, as is commonly known in the art. As such, the starter motor 76 is configured to crank the engine 12. Engine cranking is performed by controlling the starter motor 76 to engage a flywheel so as to initiate combustion.

Moreover, the powertrain system 11 comprises a transmission arrangement 17. The transmission arrangement 17 comprises a gearbox 16 and a controllable clutch 14.

The gearbox 16 has a number of gear stages to obtain a set of gears. Each one of the gears has a corresponding gear ratio. The transmission arrangement 17 may sometimes be denoted simply as the transmission.

The transmission arrangement 17 is operatively connected to the engine 12 via a transmission input shaft 15. Therefore, the transmission arrangement 17 comprises the transmission input shaft 15. The transmission input shaft 15 rotates with a certain rotational speed while the vehicle 10 is moving. Hence, the transmission input shaft 15 has a corresponding rotational speed. The transmission input shaft 15 is one example of a powertrain shaft. The transmission arrangement 17 also has a transmission output shaft 18 for providing a rotational speed to one or more drive wheels 20 of the vehicle 10, as schematically illustrated in FIG. 1. Briefly stated, the engine output shaft 13 transmits rotational speed from the engine 12 to the transmission arrangement 17 which further transmits the motion via the transmission output shaft 18 to the drive wheels 20, which in FIG. 1 is a pair of rear wheels 21.

The transmission output shaft 18 rotates with a certain rotational speed while the vehicle is moving. Hence, the transmission output shaft 18 has a corresponding rotational speed. The transmission output shaft 18 is another example of a powertrain shaft.

As illustrated in FIG. 1, the vehicle 10 here comprises a pair of front wheels 22 and the pair of rear wheel 21. Moreover, the rear wheels 21 are here driven wheels, while the front wheels 22 are non-driven wheels. The driven wheels 21 are operatively connected to corresponding rotational drive axles 24. The non-driven wheels 22 are operatively connected to corresponding rotational non-driven axles 26. Typically, the vehicle 10 comprises one or more driven wheels and one or more non-driven wheels. The driven wheels 21 are driven by the powertrain system 11.

As such, the pair of front wheels 22 are here operatively connected to the respective non-driven axles 26. In a similar vein, the pair of rear wheels 21 are here operatively connected to the respective driven axles 24.

The transmission arrangement 17 is one of a semi-automatic transmission arrangement and an automatic transmission arrangement. Automatic transmission arrangements are common in heavy-duty vehicles to control engagement and disengagement of e.g. an automated disk-clutch between the engine and the transmission arrangement. An automatic transmission arrangement is typically made up of the input shaft 15, the intermediate shaft 16a, which has at least one gearwheel in engagement with a gearwheel on the input shaft 15, and an internal main shaft (not shown) with gearwheels which engage with gearwheels on the intermediate shaft 16a. The internal main shaft is also connected to the transmission output shaft 18 coupled to the driving wheels 21 via, for example, the drive shaft(s) 24.

The drive shaft 24 rotates with a certain rotational speed while the vehicle 10 is moving. Hence, the drive shaft 24 has a corresponding rotational speed. The drive shaft 24 is another example of a powertrain shaft.

In one example, when the transmission arrangement 17 comprises the intermediate shaft 16a arranged in the transmission arrangement 17, the transmission intermediate shaft 16a rotates with a certain rotational speed while the vehicle is moving. Hence, the transmission intermediate shaft 16a has a corresponding rotational speed. The transmission intermediate shaft 16a is another example of a powertrain shaft.

The transmission arrangement 17 is in this example an automated manual transmission (AMT), configured to transmit torque to the drive wheels 21. Typically, the transmission arrangement 17 is configured to transmit torque to the drive wheels 21 via the transmission output shaft 18 via one or more driven wheel shafts 24 or the like. In other words, the vehicle 10 is typically provided with an engine 12 operatively connected to the transmission arrangement 17, such as an automated manual transmission (AMT), for transmitting torque to the vehicle driven wheels 21.

As mentioned above, and as also illustrated in FIG. 1, the powertrain system 11 also comprises the clutch 14. The clutch 14 is here a controllable clutch. The controllable clutch 14 is e.g. controllable by the processing circuitry 102 of the computer system 100. Hence, the term controllable clutch refers to a clutch that is configured to be controllable by a processing circuitry, such as the processing circuity 102. For ease of reference, the controllable clutch may simply be referred to as the clutch 14. The clutch 14 can be arranged in several manners in the powertrain system 11. In FIG. 1, the controllable clutch 14 is arranged in-between the engine 12 and the transmission arrangement 17. The controllable clutch 14 is configured to operatively connect the transmission arrangement 17 with the engine 12. In particular, the controllable clutch 14 is configured to operatively connect the engine output shaft 13 of the engine 12 to the transmission input shaft 15 of the transmission arrangement 17. As such, the engine output shaft 13 of the engine 12 can be operatively connected to the transmission input shaft 15 of the transmission arrangement 17 via the controllable clutch 14 when a gear is engaged. As is commonly known in the art, the transmission arrangement 17 and the clutch 14 are hereby operable to select a gear ratio between the engine 12 and a pair of the driven wheels 21. While FIG. 1 schematically illustrates an example where the transmission arrangement 17 includes the controllable clutch 14, the controllable clutch 14 can also be a stand-alone device of the powertrain system 11.

The controllable clutch 14 is a mechanical component configured to transfers power from the engine 12 into the transmission arrangement 17. Moreover, the controllable clutch 14 is configured to disconnect the engine 12 from the gearbox 16 and the rest of the transmission arrangement 17, when required. The controllable clutch 14 is here configured for transmitting the rotational torque from the engine 12 to the driven wheels 21. By way of example, the controllable clutch 14 is one of a single clutch unit, a dual-clutch unit, or any other type of multi-clutch unit.

The controllable clutch 14 is controlled by the computer system 100. In particular, the controllable clutch 14 is controlled by the processing circuitry 102 of the computer system 100. By way of example, the controllable clutch 14 is controlled by the processing circuitry 102 of the computer system 100 via a clutch actuator 30, as illustrated in FIG. 1.

The controllable clutch 14 allows the computer system 100 to engage or disengage the engine's power from the wheels 20. The controllable clutch 14 is thus configured to engage the engine 12 to the gearbox 16 as well as to disengage the engine 12 from the gearbox 16. The controllable clutch 14 can also be used to allow smooth standing starts through clutch control, which partially engages allowing the clutch to slip. In this example, the controllable clutch 14 is also controlled to restart the engine 12 while the vehicle 10 is moving. As such, the controllable clutch 14 is used for restarting the engine 12.

By means of the clutch 14, the engine 12 can be connected to the one or more drive wheels, such as the wheels 21. Also, by means of the clutch 14, the engine 12 can be disconnected from the one or more drive wheels, such as the wheels 21. The engine 12 may also be disconnected from the one or more drive wheels by setting the transmission to neutral, meaning that no gear is engaged.

Optionally, the vehicle 10 also includes a differential function 19 arranged in-between the pair of driven wheels 21 and the transmission arrangement 17. The differential function 19 mechanically (operatively) connects the output shaft 18 of the transmission arrangement 17 with the driven axles 24. By means of the differential function 19, the engine 12 can be connected to the one or more drive wheels, such as the wheels 21. The differential function 19 is a well-known standard component and thus not further described herein.

The vehicle 10 may optionally include a service brake unit (not shown). The service brake unit may be a wet brake type or a dry brake type. The service brake unit is typically configured for performing a brake function. As an example, the service brake unit is a wheel brake. In addition, a service brake unit may be provided for each wheel.

Turning again to the transmission arrangement 17. The transmission arrangement 17 may be configured to be controlled by the driver and/or automatically via an electronic control unit (ECU). One example of an ECU is a transmission control unit. In FIG. 1, the powertrain system 11 comprises the transmission control unit (TCU) 50. The transmission control unit may also be denoted as a transmission electronic control unit (TECU). By way of example, the TCU 50 is an integral part of the computer system 100. The TCU 50 is configured to control the transmission arrangement 17. Hence, the TCU 50 is configured to control the controllable clutch 14 and the gearbox 16.

The computer system 100 may also comprise an automatically controlled engine start system 54. The automatically controlled engine start system 54 is configured to automatically control the operation of shutting down the engine 12 and restarting the engine 12 while the vehicle 10 is moving. The automatically controlled engine start system 54 is here an integral part of an automatic and predictive engine stop-and-start system. Such system is configured to predict suitable situations where the engine can be shutdown and restarted, while the vehicle 10 is moving, and also configured to control the shutdown and restart of the engine 12, while the vehicle 10 is moving. The automatically controlled engine start system 54 may include a predictive cruise control system, or at least be configured to communicate with a predictive cruise control system of the vehicle 10. Hence, the computer system 100 may also comprise a predictive cruise control system. The predictive cruise control system is here an automatic predictive cruise control system 55, as illustrated in FIG. 1. A predictive automatic cruise control system is for example configured to control a speed of the vehicle based on a vehicle target speed in automatic manner. The automatic predictive cruise control system 55 is also configured to control the speed of the vehicle in an automatic manner. Thus, the predictive automatic cruise control system 55 is configured to control the vehicle according to a vehicle target speed in an automatic manner. The computers system 100 here comprises the automatic predictive cruise control system 55.

The predictive cruise control system 55 is configured to control the powertrain system 11 based on predicted changes in relation to the route ahead of the vehicle 10. A predictive cruise control system 55 may generally be configured to control the vehicle 10 based on topography and route data. The predictive cruise control system 55 may comprise, or communicate with, any one of a radar or lidar sensors used to detect vehicles and obstacles ahead, camera system to provide visual data about the road and traffic conditions, and GPS (Global Positioning System) to determine the vehicle position. The predictive cruise control system may further be configured to provide, or acquire, information about the road ahead, including changes in terrain, curves, and upcoming traffic conditions, speed and distance settings, brake control data, throttle control to maintain desired speed or accelerate, etc.

The predictive cruise control system 55 typically incorporates the basic functionalities of an automatic cruise control but adds predictive elements. For example, the predictive cruise control system 55 uses GPS and digital maps to anticipate road conditions ahead, such as curves, hills, and changes in the speed limit. Hereby, the predictive cruise control system 55 is configured to adjust the vehicle's speed proactively by considering the upcoming road conditions.

The engine 12 can be started by the starter motor 76. Typically, the processing circuitry 102 is configured to perform the restart engine by the starter motor 76. By way of example, the processing circuitry 102 is configured to control the starter motor 76 to engage the flywheel of the powertrain system 11 so as to initiate combustion, as is commonly referred to as an engine cranking operation.

The engine 12 is typically started by controlling the controllable clutch 14 to a torque transfer position. In the torque transfer position, the controllable clutch 14 is set in a state in which torque is transferable between the engine 12 and the wheels 20, more specifically the driven wheels 21 (here also corresponding to the rear wheels). By controlling the controllable clutch 14 to the torque transfer position, the controllable clutch 14 is allowed to change a torque transfer between the engine 12 and the wheels 21. In this manner, the computer system 100 is configured to perform the engine restart, as described herein. The controllable clutch 14 can be controlled in several different manners. By way of example, the controllable clutch 14 is controlled to gradually change the torque transfer between the engine 12 and the wheels 21. Alternatively, or in addition, the controllable clutch 14 can be controlled to change the torque transfer between the engine 12 and the wheels 21 in step-wise manner. Hence, the clutch 14 can either be set in a partly engaged state or in a fully engaged state start the engine.

As depicted in FIG. 1, the TCU 50 is also configured to be in communication with the automatically controlled engine start system 54. As such, the TCU 50 can control the controllable clutch 14 in response to data from the automatically controlled engine start system 54. In addition, the TCU 50 is here configured to be in communication with an electronic brake system (EBS) 52. The processing circuitry 102 can either be an integral part of the TCU, or a separate part configured to be in communication with the TCU 50.

In other examples, the TCU 50 comprises the automatically controlled engine start system 54. In addition, or alternatively, the TCU 50 comprises the predictive cruise control system 55.

The TCU 50 is here also configured to be in communication with an electronic control unit of the engine 12. Such electronic control unit may be denoted as an engine electronic control unit (EECU) or an engine management system (EMS). Both the TCU 50 and the EECU (and/or EMS) are typically integral parts of the computer system 100.

In the following, an exemplary set of operations for controlling the powertrain system 11 of the heavy-duty vehicle 10 will be further described. The powertrains system 11 is controlled by the computer system 100. The computer system 100 is intended to control the powertrain system 11 of the vehicle 10, while the vehicle 10 is moving, i.e. in a non-stationary state. Accordingly, the computer system 100 is configured to control the engine 12 of the vehicle 10, while the vehicle 10 is moving.

The following operations may generally be performed by the processing circuitry 102 of the computer system 100 so as to control the powertrain system 11, while the vehicle 10 is moving.

The processing circuitry 102 is configured to selectively operate the powertrain system 11 in the engine stop free-wheeling mode ES-FM, in which the output shaft 13 of the engine 12 is non-rotating, and the engine 12 is disconnected from the one or more drive wheels 21. The engine stop freewheeling mode ES-FM is hereinafter denoted as the freewheeling mode ES-FM for case of reference. The processing circuitry 102 is configured to select the freewheeling mode ES-FM and control the powertrain system 11 into the engine stop freewheeling mode ES-FM based on the following prediction operation.

Initially, the processing circuitry 102 is configured to determine an opportunity for the freewheeling mode ES-FM by predicting a feasibility of restarting the engine 12 along an intended route 200 by using the controllable clutch 14. This typically means that the processing circuitry 102 predicts an opportunity for activating the freewheeling mode ES-FM based on the predicted feasibility of restarting the engine 12 along the intended route 200 by using the controllable clutch 14.

The prediction is performed when the vehicle 10 is in motion, and typically when the vehicle 10 is approaching a downgrade or another part of the route where it may be suitable to operate the powertrain system 11 in the freewheeling mode ES-FM.

Moreover, the processing circuitry 102 is configured to predict the feasibility of restarting the engine 12 by using the controllable clutch 14 by determining fulfillment of a first restarting condition and a second restarting condition. Accordingly, the processing circuitry 102 is configured to assess fulfillment of the first restarting condition and the second restarting condition.

Determining fulfillment of the first restarting condition comprises comparing current total weight of the vehicle 10 with a threshold value. The threshold value is indicative of a minimum total weight for avoiding excessive braking of the vehicle 10 during restarting at a high friction road condition with a given total gear ratio.

The current total weight is for example the gross vehicle weight (GVW). The GVW here refers to the total vehicle weight meaning total weight of truck, including any payload, and determined weight of any potential trailer coupled to the truck. The current total weight can be measured before the trip of the vehicle 10, online using one or more weight sensors, and/or be derived directly from the processing circuitry 102, as is commonly known in the art. The vehicle weight may also be derivable from a look-up table and the like.

The threshold value indicative of the minimum total weight for avoiding excessive braking of the vehicle 10 during restarting at a high friction road condition with a given total gear ratio typically refers to the minimum total weight for avoiding excessive retardation of the vehicle 10.

The minimum total weight for avoiding excessive braking of the vehicle 10 during restarting at a high friction road condition with a given total gear ratio can be derivable from predetermined threshold values stored in the memory of the computer system 100, from look-up tables and/or from calculations performed by the processing circuitry 102 while the vehicle 10 is in motion. For predicting the risk of engine restart at high friction road conditions, the processing circuitry 102 may e.g. calculate the speed reduction of the vehicle 10 caused by an engine start using the controllable clutch 14. The speed reduction should typically not exceed a certain threshold value, e.g. 1.0 km/h. It is also typically assumed that the engine start generates a constant impulse torque, e.g. 500 Nm*s. The unit of impulse torque is expressed as Newton meter seconds (Nm*s). Impulse is typically defined as the change in momentum of an object when a force is applied over a period of time. The standard unit of impulse is Newton seconds (Ns). Torque refers to the tendency of a force to rotate an object about an axis, fulcrum, or pivot. The unit of torque is Newton meters (Nm), indicating how much force acting on an object causes it to rotate. The term "impulse torque," is thus a measurement of the rotational force applied over a time period, indicating how much rotational change (in terms of speed or angular momentum) is imparted to an object over that duration. Thus, the unit Nm*s is here used to capture the rotational impulse, linking impulse (force over time) and torque (rotational force). The impulse torque unit is useful in contexts like engine starts in vehicles, where an initial force is applied to generate rotational movement over a short period, leading to a change in rotational speed.

Hence, in one example, the impulse torque, current total weight and current gear ratio are used to calculate the speed reduction of the vehicle 10.

As such, in predicting the feasibility for engine restart using the clutch 14, the processing circuitry 102 performs a comparison which considers the current total weight of the vehicle 10 against a threshold. The threshold is also adjusted for the given total gear ratio, reflecting how different gear ratios can influence the braking behavior of the vehicle on high friction surfaces. For instance, a lower total gear ratio (indicating a higher gear) might allow for a restart using the clutch 14 under heavier loads, thereby reducing the risk of excessive braking force. The aim with the first restarting condition is thus to ensure that the vehicle 10 can restart without the risk of causing an excessive braking force that could lead to instability or unnecessary wear.

To this end, the threshold contains data about the total gear ratio based on the assumption that when the vehicle 10 is in motion and the engine 12 is restarted using the clutch 14, the gear that is engaged at the moment of restart affects the total gear ratio. Each gear in the transmission has a different gear ratio, which, when multiplied by the final drive ratio, gives the total gear ratio. Therefore, the total gear ratio is directly dependent on the gear selected during the engine restart.

Moreover, determining fulfillment of the second restarting condition comprises comparing a current drive axle load with a corresponding threshold value. The corresponding threshold value is indicative of a minimum drive axle load on the drive axle (driven axle) 24 for avoiding excessive wheel slip during restarting at a low friction road condition with a given total gear ratio. The use of the corresponding threshold in determining the second restarting condition thus accounts for how varying gear ratios affect wheel slip, particularly on low friction road surfaces. For instance, a lower total gear ratio (indicating a higher gear) might allow for a restart under heavier loads or on slipperier surfaces by providing more torque to the wheels, thereby reducing the risk of wheel slip. Thus, also the corresponding threshold is adjusted for the given total gear ratio, reflecting how different gear ratios can influence the vehicle's braking behavior on low friction surfaces.

The use of the corresponding threshold ensures that the vehicle 10 can restart with minimized risk of wheel slip, enhancing safety and control during the restart process.

Similar to the first restating condition, the corresponding threshold value of the second restarting condition can be derived from predetermined threshold values stored in the memory of the computer system 100, from look-up tables and/or from calculations performed by the processing circuitry 102 while the vehicle 10 is in motion. For example, the corresponding threshold value of the second restarting condition can be predetermined based on previous tests of controlling whether engine restart can occur on a well-defined slippery surface with different combinations of gearing and drive axle pressure. Based on these tests, a look-up table can be produced that contains data indicative of minimum allowable drive axle pressure because of the total gearing.

One example of a high friction road surface is asphalt. Examples of low-friction road surfaces, i.e. slippery road surfaces, are ice, snow and oil spill surfaces.

Accordingly, the processing circuitry 102 is configured to determine fulfillment of the first restarting condition by comparing current total weight of the vehicle 10 with a threshold value, wherein the threshold value is indicative of a minimum total weight for avoiding excessive deceleration (such as braking) of the vehicle 10 during restarting at a high friction road condition with a given total gear ratio, and further configured to determine fulfillment of the second restarting condition by comparing a current drive axle load with a corresponding threshold value, wherein the corresponding threshold value is indicative of a minimum axle load on the drive axle (driven axle) 24 for avoiding excessive wheel slip during restarting at a low friction road condition with a given total gear ratio.

The processing circuitry 102 is also configured to control the powertrain system 11 into the freewheeling mode ES-FM upon the determined fulfillment of the first restarting condition and second restarting condition, respectively.

As mentioned above, the processing circuitry 102 is configured to control the powertrain system 11 into the freewheeling mode ES-FM by changing a rotating state of the output shaft 13 to a non-rotating state, and disconnecting the engine 12 from the drive wheels 21.

Typically, the processing circuitry 102 is configured to initiate activation of the freewheeling mode ES-FM based on topography data and vehicle data.

For example, the processing circuitry 102 is configured to control the powertrain system 11 and the vehicle 10 from topography data by analyzing and extracting relevant information about the route, including distance, elevation changes, road conditions, and other factors that can affect the vehicle's performance and fuel consumption. The processing circuitry 102 is configured to obtain topography data from various sources, such as digital maps, GPS data, or geographic information system (GIS) databases. These sources may generally include relevant information about the road network, including roads, highways, elevation data, and potential destinations. In one example, the topography data is received by the processing circuitry 102 from a route planner system in the vehicle. The topography data may likewise be acquired by a so-called look ahead device, which is typically an integral part of an ordinary cruise control system. The look ahead device may in addition, or alternatively, be an integral part of the computer system 100.

The processing circuitry 102 is typically also configured to determine a starting point in time for the freewheeling mode ES-FM based on topography data and vehicle data.

The automatically controlled engine start system 54 is here configured to automatically control the engine 12 of the powertrain system 11 of vehicle 10, such as the above modes, including shutdown of the engine 12 and engine restarts while the vehicle 10 is moving along the route.

The automatically controlled engine start system 54 is configured to control the powertrain system 11 from vehicle data that can be gathered from various vehicle sensors, from a navigation system of the vehicle 10, from data received from one or more control units of the vehicle 10, and/or from various technologies and systems for tracking and monitoring the vehicle 10. Thus, the processing circuitry 102 is configured to receive data and store data in the memory 104 of the computer system 100.

Turning now again to the first restarting condition and second restarting condition. Typically, the processing circuitry 102 is configured to determine the given total gear ratio by predicting which gear is to be engaged at the moment of engine restart. The gear to be engaged at the moment of engine restart is for example predicted based on the acquired topography data.

Moreover, in this example, the processing circuitry 102 is configured to determine fulfillment of the first restarting condition by determining that the total weight of the vehicle 10 meets, or exceeds, the threshold value.

Analogously, the processing circuitry 102 is configured to determine fulfillment of the second restarting condition by determining that the current drive axle load meets, or exceeds, the threshold value.

In some examples, the processing circuitry 102 is also configured to determine non-fulfillment of the first and second restarting conditions, and upon determined non-fulfillment of the first and second restarting conditions, further determine to avoid, or postpone, controlling the powertrain system 11 into the freewheeling mode ES-FM.

Alternatively, or in addition, the processing circuitry 102 is configured to determine non-fulfillment of the first and second restarting conditions, and upon determined non-fulfillment of the first and second restarting conditions, further determine to restart engine along the intended route 200 by using the starter motor 76, and control the powertrain system 11 into the freewheeling mode ES-FM.

It should be noted that although the above example refers to a situation in which both the first restarting condition and the second restarting condition are determined and further required to be fulfilled for the purpose of controlling the powertrain system 11 into the freewheeling mode ES-FM, it may occasionally be enough to determine fulfillment on only one of the restarting conditions for allowing the powertrain system 11 to be controlled into the freewheeling mode ES-FM.

Thus, in example, the processing circuitry 102 is configured to determine the feasibility of restarting the engine 12 by using the controllable clutch 14 by determining fulfillment of the first restarting condition, and further configured to control the powertrain system 11 into the freewheeling mode ES-FM upon fulfillment of the first restarting condition. Accordingly, the processing circuitry 102 is configured to assess fulfillment of the first restarting condition by comparing current total weight of the vehicle 10 with a threshold value, wherein the threshold value is indicative of a minimum total weight for avoiding excessive deceleration (such as braking) of the vehicle 10 during restarting at a high friction road condition with a given total gear ratio.

In another example, the processing circuitry 102 is configured to determine the feasibility of restarting the engine 12 by using the controllable clutch 14 by determining fulfillment of the second restarting condition, and further configured to control the powertrain system 11 into the freewheeling mode ES-FM upon fulfillment of the second restarting condition. Accordingly, the processing circuitry 102 is configured to assess fulfillment of the second restarting condition by comparing a current drive axle load with a corresponding threshold value, wherein the corresponding threshold value is indicative of a minimum axle load on the drive axle (driven axle) 24 for avoiding excessive wheel slip during restarting at a low friction road condition with a given total gear ratio.

Typically, the processing circuitry 102 is configured to determine the feasibility of restarting the engine 12 by using the controllable clutch 14 by determining fulfillment of both the first restarting condition and the second restarting condition, and further configured to control the powertrain system 11 into the freewheeling mode ES-FM upon fulfillment of both the first restarting condition and the second restarting condition. As such, these restarting conditions are considered independent from each other, and both need to be fulfilled; that is, both restarting conditions must be met to allow the freewheeling mode ES-FM. To this end, two independent restarting conditions are predicted by the computer system 100. The total weight needs to exceed the calculated threshold for total weight, and the drive axle pressure needs to surpass the calculated corresponding threshold for drive axle pressure. Both restarting conditions must also be satisfied to allow entering the freewheeling mode ES-FM.

Figure 2:
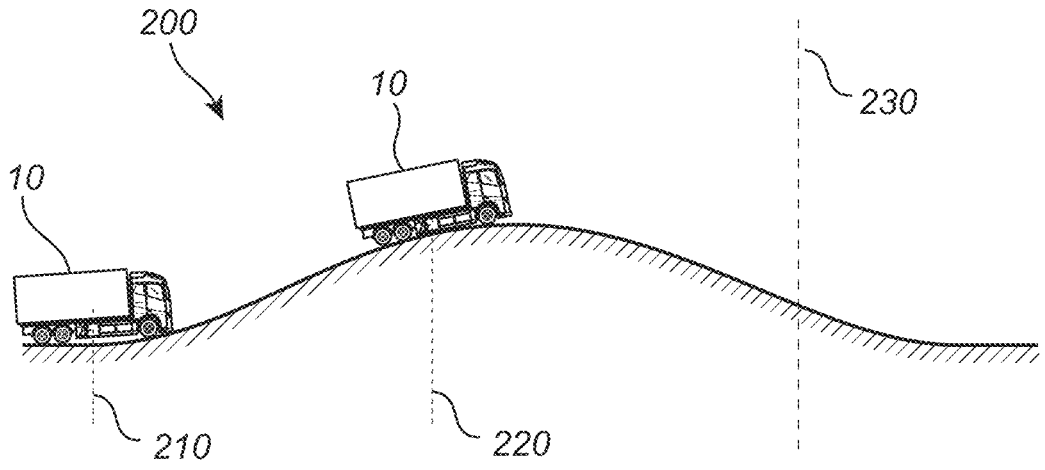
FIG. 2 illustrates an example of controlling a powertrain system of a vehicle according to an example.

FIG. 2 illustrates an example of controlling a powertrain system of a vehicle, such as the powertrain system 11 of the vehicle 10 of FIG. 1, along a road, i.e. along an intended route 200 for the vehicle 10. More specifically, FIG. 2 schematically illustrates an example of a heavy-duty vehicle in the form of a loaded truck 10 driving uphill, over a crest and downhill, in which the computer system 100 is used to control the powertrain system 11 according to the operations and methods, as described herein.

For ease of reference, an extension of the intended route is here indicated by a number of locations 210, 220 and 230 along the road. The road segment between location 210 and location 220 is indicative of an uphill road segment, location 220 is indicative of a crest segment, or slightly after the crest, and the road segment between location 220 and location 230 is indicative of a downhill segment. It should be noted that the crest is the highest point of a hill or slope in a road.

Along the route 200, the processing circuitry 102 acquires data from the predictive cruise control system 55 to determine and set a target speed for the vehicle 10. The processing circuitry 102 may also take input from the driver into account for setting the target speed. In this manner, the processing circuitry 102 determines the vehicle target speed for the vehicle 10. In this example, the processing circuitry 102 determines the vehicle target speed for the vehicle 10 as it travels uphill at location 210. The processing circuitry 102 may likewise determine, or estimate, the vehicle target speed for the vehicle 10 as it approaches the crest at 220 and the downhill segment at 230.

Moreover, at the location 210, the processing circuitry 102 predicts whether there is an opportunity for activating the freewheeling mode ES-FM for an upcoming road segment along the route 200. The processing circuitry 102 predicts the opportunity for activating the freewheeling mode ES-FM based on the possibility of restarting the engine 12 along an intended route 200 by using the controllable clutch 14. More specifically, the processing circuitry 102 determines the opportunity for the freewheeling mode ES-FM by predicting the feasibility of restarting the engine 12 along the intended route 200 by using the controllable clutch 14. In this example, the processing circuitry 102 determines that it would be feasible to restart the engine 12 at the location 230, as illustrated in FIG. 2.

Predicting the feasibility of restarting the engine 12 by using the controllable clutch 14 comprises determining fulfillment of the first restarting condition and the second restarting condition, as mentioned herein. The processing circuitry 102 determines the fulfillment of the first restarting condition by comparing current total weight of the vehicle 10 with the threshold value indicative of the minimum total weight for avoiding excessive deceleration of the vehicle 10 during restarting at a high friction road condition with at given total gear ratio. Moreover, the processing circuitry 102 determines the fulfillment of the second restarting condition by comparing the current drive axle load with the corresponding threshold value indicative of the minimum drive axle load on the drive axle 24 for avoiding excessive wheel slip during restarting at a low friction road condition with at a given total gear ratio.

By way of example, the given total gear ratio is determined by predicting which gear is to be engaged at the moment of engine restart at the location 230. The gear to be engaged at the moment of engine restart is predicted based on topography data about the intended route 200.

Moreover, at the location 210, the processing circuitry 102 determines that the first restarting condition is fulfilled by determining that the total weight of the vehicle 10 meets, or exceeds, the threshold value. In addition, at the location 210, the processing circuitry 102 determines that the second restarting condition is fulfilled by determining that the current drive axle load meets, or exceeds, the corresponding threshold value.

To this end, the processing circuitry 102 determines that the first restarting condition and second restarting condition are fulfilled, respectively. Such determination means that the engine 12 can be restarted at a desired location, e.g., at the location 230, by using the controllable clutch 14 to perform the engine restart, regardless of the road condition. As such, the processing circuitry 102 determines that it is feasible for the powertrain system 11 to be operated in the freewheeling mode ES-FM because the engine 12 can be restarted at the desired location, e.g. at the location 230.

The decision to restart the engine 12 using the controllable clutch 14 is thus not just about whether it is permissible or allowable to restart the engine 12 using the controllable clutch 14, but rather if it is a sensible and practical choice considering the operational context of the vehicle 10.

In other examples, the processing circuitry 102 may conclude, that there is a non-fulfillment of the first restarting condition and second restarting condition. In such situation, upon a determined non-fulfillment of the first and second restarting conditions, the processing circuitry 102 instead determines to avoid, or postpone, controlling the powertrain system 11 into the freewheeling mode ES-FM. Alternatively, the processing circuitry 102 may, upon determined non-fulfillment of the first and second restarting conditions, determine to restart engine along the intended route 200 by using the starter motor 76 (rather than the clutch 14), and subsequently determine to control the powertrain system 11 into the freewheeling mode ES-FM.

Subsequently, or concurrently with determining fulfillment of the first and second restarting conditions, the computer system 100 typically determines to set the freewheeling mode ES-FM responsive to other parameters. For example, the processing circuitry 102 determines whether the powertrain system 11 should enter, or be operated, in either the freewheeling mode ES-FM or the freewheeling mode ED-FM along the route, e.g. on the crest, over the crest, or just after the crest. In this example, the operation of determining whether the powertrain system 11 should enter, or be operated, in one of the freewheeling modes along the route is performed in a predictive manner.

The decision to enter one of the freewheeling modes, such as the freewheeling mode ES-FM, is typically based on an analysis of vehicle data (such as mass of the vehicle) and topography data (e.g. road gradient). Typically, the processing circuitry 102 is configured to continuously simulate the speed behavior of the vehicle 10 so as to determine whether a freewheeling mode condition is fulfilled. As such, the processing circuitry 102 determines whether the vehicle 10 can be freewheeling along the road without falling below a minimum allowable speed. The processing circuitry 102 thus determines that vehicle 10 is capable of entering the engine stop freewheeling mode ES-FM without the speed dropping below a predetermined lower limit, which is deemed acceptable or safe for the road conditions ahead, including any remaining uphill segments, crests, and downhill segments. It should also be noted that the processing circuitry 102 may incorporate additional data into the determination process, such as aerodynamics data and road surface friction.

Optionally, the processing circuitry 102 determines a freewheeling mode condition for the powertrain system 11 of the vehicle 10 either before reaching the crest or, in some instances, upon reaching the crest itself. The processing circuitry 102 determines the suitability of entering the freewheeling mode ES-FM based on acquired vehicle data, such as the mass of vehicle 10, in combination with topography data, such as road gradient or inclination.

The acquired vehicle data and topography data are decisive for determining whether the powertrain system 11 should be set into the engine stop freewheeling mode ES-FM. For example, the decision is made through a comparison with one or more threshold levels and/or by comparing against previous vehicle data stored in memory as a look-up table.

Moreover, when the powertrain system 11 is operating in the engine stop freewheeling mode ES-FM, the processing circuitry 102 typically determines to maintain the engine stop freewheeling mode ES-FM until reaching the vehicle target speed, or until a braking condition is fulfilled. In FIG. 2, this is reflected by the location 230 for ease of reference.

Determining that the target speed is reached is typically performed by the processing circuitry 102 in collaboration with the cruise control system 55, as commonly known in the art.

Determining fulfillment of the braking condition can be performed in several different ways by the computer system 100. For example, the processing circuitry 102 determines fulfillment of the braking condition by predicting a maximum vehicle speed for the engine braking mode. The processing circuitry 102 then determines that the braking condition is fulfilled if the predicted maximum vehicle speed exceeds the vehicle target speed. The vehicle target speed typically refers to the allowable vehicle speed. The maximum vehicle speed for the engine braking mode is typically predicted from topography data and vehicle data, including data indicative of the gradient of the slope, the length of the slope, and the mass of the vehicle.

Upon the vehicle 10 is reaching the vehicle target speed in the engine stop freewheeling mode ES-FM, e.g. at location 230 in FIG. 2, the processing circuitry 102 determines to switch from the engine stop freewheeling mode ES-FM to another operational mode, such as the engine braking mode EBM. Alternatively, the processing circuitry 102 determines to switch from the engine stop freewheeling mode ES-FM to an operational mode in the form of the coasting mode, or a conventional propulsion mode.

To this end, the processing circuitry 102 determines to control the powertrain system 11 to restart the engine 12. In this example, the engine 12 is restarted by the clutch 14. Likely, the engine restart using the controllable clutch 14 is successful given the previous prediction of determining the suitability of the engine stop freewheeling mode ES-FM and the fulfillment of the first and second restarting conditions. In other examples, the engine 12 can be restarted by the starter motor, as described herein.

Moreover, as mentioned herein, the processing circuitry 102 is configured to selectively operate the powertrain system 11 in a number of operational modes, comprising the engine disconnected freewheeling mode ED-FM, the engine stop freewheeling mode ES-FM, the coasting mode CM, and the engine braking mode EBM. In the context of the present disclosure, "engine disconnected freewheeling mode" refers to an operational mode in which an output shaft of the engine is rotating, the engine is disconnected from the one or more drive wheels, and fuel is being supplied to the engine. An operational mode where the output shaft of the engine is rotating indicates that the engine is in an active state, such as in an operating mode, engine-on mode, power generation mode, or idling mode. In the engine disconnected freewheeling mode ED-FM, the engine is active and running, but not engaged with the drivetrain for propulsion.

Besides that the engine disconnected freewheeling mode ED-FM has a positive impact on fuel consumption, operating the powertrain system in the engine disconnected freewheeling mode ED-FM may be advantageous in operating situations where battery recharging may be needed. The engine disconnected freewheeling mode ED-FM allows the engine to run, thereby actively charging the battery, as e.g. opposed to the engine stop freewheeling mode ES-FM. In the latter, the engine is inactive (non-operating) and therefore unable to charge the battery, presenting a risk of inadequate battery power to restart the engine using the starter motor. Additionally, the engine disconnected freewheeling mode ED-FM may be beneficial in situations where the operating temperature of the engine exceeds normal thresholds, necessitating the activation of the engine cooling system for active thermal management.

Moreover, in the context of the present disclosure, the "coasting mode" (CM) refers to an operational mode in which the output shaft of the engine is rotating, the engine is connected to the one or more drive wheels, and fuel supply to the engine being interrupted. In coasting mode, the vehicle moves by its own momentum with minimal engine resistance. Operating a vehicle in the coasting mode may also contribute to lowering the fuel consumption in comparison to a conventional propulsion mode, as fuel supply is interrupted in the coating mode.

Further, in the context of the present disclosure, the "engine braking mode" (EBM) refers to an operational mode in which the output shaft of the engine is rotating, the engine is connected to the one or more drive wheels, and the engine is further operated so as to generate a braking effect. Operating the engine so as to generate a braking effect means that the engine is actively controlled to increase the internal resistance within the engine, thereby slowing down the vehicle. Engine braking increases engine load to create braking force, for example, by releasing compressed air from the cylinders just before the compression stroke completes (compression release) or creating back pressure in the exhaust system (exhaust brake) to slow down the vehicle. Engine braking may be particularly useful in heavy-duty vehicles for maintaining control and reducing speed on long downhill gradients without overheating the service brakes.

In the above modes, the fuel is supplied to the engine 12 by the fuel injector 78, as described herein. The control of fuel to the engine 12 is also controlled by controlling the fuel injector 12, as described herein.

The transitions between the various operational modes of the powertrain system, including the freewheeling modes, can be performed in an automatic manner by a computer system, including e.g. an automatically controlled engine start system. The automatically controlled engine start system is typically an integral part of a so-called automatic and predictive engine stop-and-start system for vehicles. Automatic and predictive engine stop-and-start systems are configured to automatically control one or more vehicle and powertrains operations, such as shutting-down and restarting the engine, using predictive data and real-time information.

While the use of the automatic and predictive engine stop-and-start systems in heavy-duty vehicles provides a positive impact on the operation of the vehicle, there is still a challenge to determine a suitable transition between the available operational modes of the powertrain system including the freewheeling modes, and any other operational mode, such as propulsion mode, coasting mode, and engine braking mode.

As mentioned herein, the computer system 100 may be an integral part of the powertrain system 11, wherein the powertrain system 11 comprises at least the engine 12, the controllable clutch 14, the transmission 17 arranged to be coupled to the engine 12 by means of the controllable clutch 14, and wherein the transmission 17 further comprises the output shaft 18 configured to be coupled to the drive axle 24 of a set of wheels 20, 21.

Figure 3:
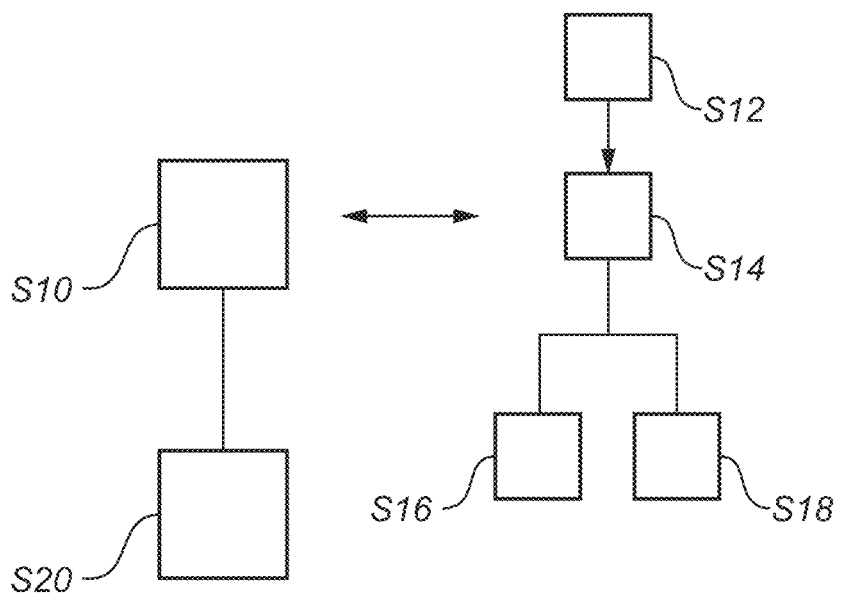
FIG. 3 is a flow chart of an exemplary method for controlling a powertrain system of a vehicle according to an example.

FIG. 3 is a flow chart of a method according to an example. More specifically, FIG. 3 is an exemplary computer implemented method 300 according to an example. The computer-implemented method 300 of FIG. 3 is also intended for controlling the powertrain system 11 of the heavy-duty vehicle 10 in FIG. 1. The method is typically implemented by the processing circuitry 102. As mentioned above in relation to FIGS. 1 and 2, the powertrain system 11 is selectively operable in a number of operational modes, comprising at least the engine stop freewheeling mode ES-FM.

As illustrated in FIG. 3, the computer-implemented method 300 comprises a step S10 of predicting, by the processing circuitry 102 of the computer system 100, an opportunity for activating the freewheeling mode. The step S10 of determining the opportunity for the freewheeling mode comprises a step S12 of predicting, by the processing circuitry 102 of the computer system 100, a feasibility of restarting the engine 12 along the intended route 200 by using the controllable clutch 14.

The step S12 of predicting the feasibility of restarting the engine 12 by using the controllable clutch 14 comprises a step S14 of determining, by the processing circuitry 102 of the computer system 100, a fulfillment of the first restarting condition and the second restarting condition. The step S14 of determining fulfillment of the first restarting condition comprises a step S16 of comparing, by the processing circuitry 102, the current total weight of the vehicle 10 with the threshold value indicative of the minimum total weight for avoiding excessive braking of the vehicle 10 during restarting at a high friction road condition with at given total gear ratio. Moreover, the step S14 of determining fulfillment of the second restarting condition comprises a step S18 of comparing, by the processing circuitry 102, the current drive axle load with the corresponding threshold value indicative of a minimum axle load on a drive axle for avoiding excessive wheel slip during restarting at a low friction road condition with at a given total gear ratio.

Subsequently, the method comprises a step S20 of controlling, by the processing circuitry 102 of the computer system 100, the powertrain system 11 into the freewheeling mode ES-FM upon the determined fulfillment of the first and second restarting conditions.

It should be noted that the steps of determining fulfillment of the first restarting condition and the second restarting condition are typically integral parts of the step of determining the opportunity for the freewheeling mode ES-FM. Moreover, the steps of determining fulfillment of the first restarting condition and the second restarting condition form the step of predicting the feasibility of restarting the engine 12. Hence, the collective initial step of the method may thus be the steps of determining fulfillment of the first restarting condition and the second restarting condition and using these decisions m as input to the step of predicting the feasibility, and subsequently determining the opportunity for the freewheeling mode ES-FM based on the predicted feasibility.

Optionally, if the processing circuitry 102 determines that there is an opportunity for the freewheeling mode ES-FM based on the predicted feasibility, the processing circuitry 102 may also determine that freewheeling mode ES-FM should be activated based on the above topography data etc.

In one example, the step S12 of predicting the feasibility of restarting the engine 12 by using the controllable clutch 14 comprises a step S14 of determining, by the processing circuitry 102 of the computer system 100, a fulfillment of any one of the first restarting condition and the second restarting condition. In such example, the method comprises a step S20 of controlling, by the processing circuitry 102 of the computer system 100, the powertrain system 11 into the freewheeling mode ES-FM upon the determined fulfillment of any one of the first restarting condition and the second restarting condition.

It should be noted that the computer system 100 may be an integral part of the powertrain system 11. In other examples, the computer system 100 and the powertrain system 11 may be separate parts configured to communicate with each other. The computer system 100 may also be a part of a remote server or the like. Hence, in some examples, there is provided a system comprising the powertrain system 11 and the computer system 100, wherein the computer system 100 is configured to be in communication with the powertrain system 11 so as to control the powertrain system 11 of the vehicle 10.

In some examples, there is provided a computer program product comprising program code for performing, when executed by the processing circuitry 102, the method 300 as described above.

In some examples, there is provided a non-transitory computer-readable storage medium comprising instructions, which when executed by the processing circuitry 102, cause the processing circuitry 102 to perform the method 300 as described above.

Further details of one example of a computer system that can be used as the computer system 100 will now be described in relation to FIG. 4.

Figure 4:
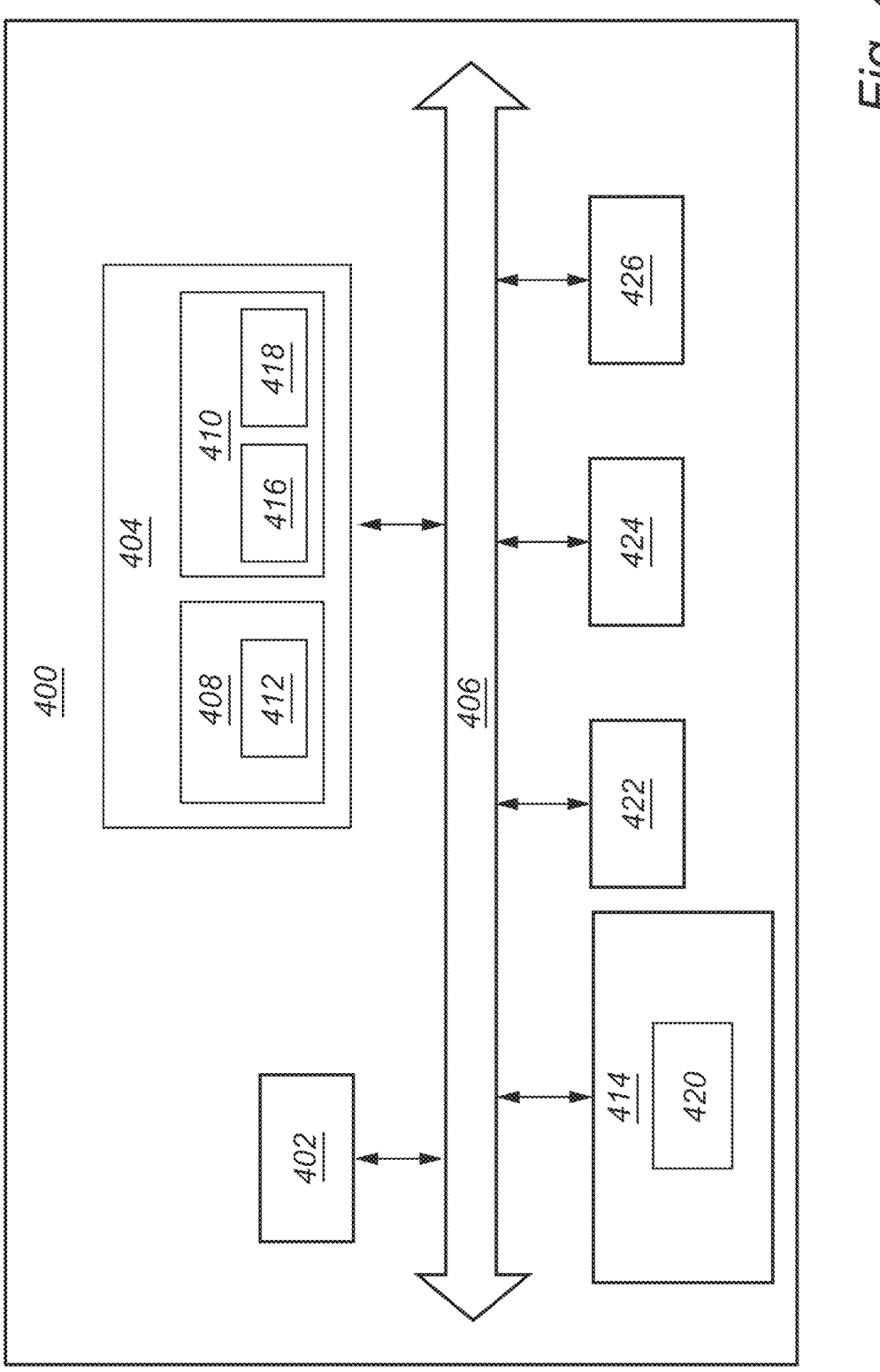
FIG. 4 is a schematic diagram of an exemplary computer system for implementing examples disclosed herein, according to an example.

FIG. 4 is a schematic diagram of a computer system 400 for implementing examples disclosed herein. The computer system 400 is adapted to execute instructions from a computer-readable medium to perform these and/or any of the functions or processing described herein. The computer system 400 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 400 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 400 may comprise at least one computing device or electronic device capable of including firmware, hardware, and/or executing software instructions to implement the functionality described herein. The computer system 400 may include processing circuitry 402 (e.g., processing circuitry including one or more processor devices or control units), a memory 404, and a system bus 406. The computer system 400 may include at least one computing device having the processing circuitry 402. The system bus 406 provides an interface for system components including, but not limited to, the memory 404 and the processing circuitry 402. The processing circuitry 402 may include any number of hardware components for conducting data or signal processing or for executing computer code stored in memory 404. The processing circuitry 402 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 402 may further include computer executable code that controls operation of the programmable device.

The system bus 406 may be any of several types of bus structures that may further interconnect to a memory bus (with or without a memory controller), a peripheral bus, and/or a local bus using any of a variety of bus architectures. The memory 404 may be one or more devices for storing data and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the processing circuitry 402 (e.g., via a circuit or any other wired, wireless, or network connection) and may include computer code for executing one or more processes described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with processing circuitry 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program 420 stored on a transitory or non-transitory computer-usable or computer-readable storage medium (e.g., single medium or multiple media), such as the storage device 414, which includes complex programming instructions (e.g., complex computer-readable program code) to cause the processing circuitry 402 to carry out actions described herein. Thus, the computer-readable program code of the computer program 420 can comprise software instructions for implementing the functionality of the examples described herein when executed by the processing circuitry 402. In some examples, the storage device 414 may be a computer program product (e.g., readable storage medium) storing the computer program 420 thereon, where at least a portion of a computer program 420 may be loadable (e.g., into a processor) for implementing the functionality of the examples described herein when executed by the processing circuitry 402. The processing circuitry 402 may serve as a controller or control system for the computer system 400 that is to implement the functionality described herein.

The computer system 400 may include an input device interface 422 configured to receive input and selections to be communicated to the computer system 400 when executing instructions, such as from a keyboard, mouse, touch-sensitive surface, etc. Such input devices may be connected to the processing circuitry 402 through the input device interface 422 coupled to the system bus 406 but can be connected through other interfaces, such as a parallel port, an Institute of Electrical and Electronic Engineers (IEEE) 1394 serial port, a Universal Serial Bus (USB) port, an IR interface, and the like. The computer system 400 may include an output device interface 424 configured to forward output, such as to a display, a video display unit (e.g., a liquid crystal display (LCD) or a cathode ray tube (CRT)). The computer system 400 may include a communications interface 426 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Moreover, the present disclosure may be exemplified by any one of the below examples.

Example 1: A computer system 100 for controlling a powertrain system 11 of a vehicle 10, the powertrain system 11 comprising an internal combustion engine 12 connectable to one or more drive wheels 20, 21, the computer system 100 comprising processing circuitry 102 configured to selectively operate the powertrain system 11 in a number of operational modes, comprising at least a freewheeling mode ES-FM, in which an output shaft of the engine 12 is non-rotating, and the engine 12 is disconnected from the one or more drive wheels 20, 21, wherein the processing circuitry 102 is further configured to: determine an opportunity for the freewheeling mode ES-FM by predicting a feasibility of restarting the engine 12 along an intended route 200 by using a controllable clutch 14; wherein predicting the feasibility of restarting the engine 12 by using the controllable clutch 14 comprises determining fulfillment of any one of a first restarting condition and a second restarting condition, wherein determining fulfillment of the first restarting condition comprises comparing current total weight of the vehicle 10 with a threshold value indicative of a minimum total weight for avoiding excessive braking of the vehicle 10 during restarting at a high friction road condition with a given total gear ratio, wherein determining fulfillment of the second restarting condition comprises comparing a current drive axle load with a threshold value indicative of a minimum axle load on a drive axle for avoiding excessive wheel slip during restarting at a low friction road condition with a given total gear ratio; and control the powertrain system 11 into the freewheeling mode upon the determined fulfillment of any one of the first restarting condition and the second restarting condition.

Example 2. Computer system 100 according to example 1, wherein the processing circuitry 102 is configured to control the powertrain system 11 into the freewheeling mode by changing a rotating state of the output shaft to a non-rotating state, and disconnecting the engine 12 from the one or more drive wheels 20, 21.

Example 3. Computer system 100 according to example 1 or example 2, wherein the processing circuitry 102 is further configured to initiate activation of the freewheeling mode based on topography data and vehicle data.

Example 4. Computer system 100 according to any one of preceding examples, wherein the processing circuitry 102 is further configured to determine a starting point in time for the freewheeling mode based on topography data and vehicle data.

Example 5. Computer system 100 according to any one of preceding examples, wherein the processing circuitry 102 is further configured to determine the given total gear ratio by predicting which gear is to be engaged at the moment of engine restart.

Example 6. Computer system 100 according to example 5, wherein the gear to be engaged at the moment of engine restart is predicted based on topography data.

Example 7. Computer system 100 according to any one of preceding examples, wherein the processing circuitry 102 is configured to determine fulfillment of the first restarting condition by determining that the total weight of the vehicle 10 meets, or exceeds, the threshold value.

Example 8. Computer system 100 according to any one of preceding examples, wherein the processing circuitry 102 is configured to determine fulfillment of the second restarting condition by determining that the current drive axle load meets, or exceeds, the threshold value.

Example 9. Computer system 100 according to any one of preceding examples, wherein the processing circuitry 102 is configured to determine non-fulfillment of the first and second restarting conditions, and upon determined non-fulfillment of the first and second restarting conditions, further determine to avoid, or postpone, controlling the powertrain system 11 into the freewheeling mode.

Example 10. Computer system 100 according to any one of preceding examples, wherein the processing circuitry 102 is configured to determine non-fulfillment of the first and second restarting conditions, and upon determined non-fulfillment of the first and second restarting conditions, further determine to restart engine along the intended route 200 by using a starter motor, and control the powertrain system 11 into the freewheeling mode.

Example 11. Computer system 100 according to any one of preceding examples, wherein the processing circuitry 102 is configured to predict the feasibility of restarting the engine by using the controllable clutch by determining fulfillment of only the first restarting condition, and further configured to control the powertrain system into the freewheeling mode upon the determined fulfillment of only the first restarting condition.

Example 12. Computer system 100 according to any one of preceding examples 1 to 11, wherein the processing circuitry 102 is configured to predict the feasibility of restarting the engine by using the controllable clutch by determining fulfillment of only the second restarting condition, and further configured to control the powertrain system into the freewheeling mode upon the determined fulfillment of only the second restarting condition.

Example 13. Computer system 100 according to any one of preceding examples 1 to 10, wherein the processing circuitry 102 is configured to predict the feasibility of restarting the engine by using the controllable clutch by determining fulfillment of both the first restarting condition and the second restarting condition, and further configured to control the powertrain system into the freewheeling mode upon the determined fulfillment of both the first restarting condition and the second restarting condition.

Example 14. A powertrain system 11 comprising a computer system 100 according to any one of examples 1 to 10, an internal combustion engine 12, a controllable clutch 14, a transmission 17 arranged to be coupled to the internal combustion engine 12 by means of the controllable clutch 14, and wherein the transmission 17 further comprises an output shaft 18 configured to be coupled to a driven axle 24 of a set of wheels 20, 21.

Example 15. A vehicle 10 comprising a computer system 100 of any of the examples 1 to 13 and/or a powertrain system 11 according to example 14.

Example 16. A computer-implemented method 300 for controlling a powertrain system 11 of a vehicle 10, the powertrain system 11 comprising an internal combustion engine 12 connectable to one or more drive wheels 20, 21, the powertrain system 11 being operable in a number of operational modes, including at least a freewheeling mode ES-FM, in which an output shaft of the engine 12 is non-rotating, and the engine 12 is disconnected from the one or more drive wheels 20, 21, wherein the method comprises determining an opportunity for the freewheeling mode by predicting a feasibility of restarting the engine 12 along an intended route 200 by using a controllable clutch 14, wherein predicting the feasibility of restarting the engine 12 by using the controllable clutch 14 comprises determining fulfillment of any one of a first restarting condition and a second restarting condition, wherein determining fulfillment of the first restarting condition comprises comparing current total weight of the vehicle 10 with a threshold value indicative of a minimum total weight for avoiding excessive braking of the vehicle 10 during restarting at a high friction road condition with at given total gear ratio, wherein determining fulfillment of the second restarting condition comprises comparing a current drive axle load with a threshold value indicative of a minimum drive axle load on a drive axle for avoiding excessive wheel slip during restarting at a low friction road condition with at a given total gear ratio; and controlling the powertrain system 11 into the freewheeling mode upon the determined fulfillment of any one of the first restarting condition and the second restarting condition.

Example 17. A computer program product comprising program code for performing, when executed by the processing circuitry 102, the method of example 16.

Example 18. A non-transitory computer-readable storage medium comprising instructions, which when executed by the processing circuitry 102, cause the processing circuitry 102 to perform the method of example 16.

The term "operatively connected", as used herein, typically means that a first component is in operative relation to another second component. By way of example, the term operatively connected means that the first component is connectable, or connected, to the second component in a manner allowing a transfer of a rotational movement and/or rotational torque from the first component to the second component. Therefore, the term encompasses a functional construction in which two components are connected such that the rotational speed of the first component corresponds to the rotational speed of the second component. However, the term also encompasses a functional construction in which there is a ratio between the rotational movement of the first component and the rotational movement of the second component, i.e., the rotational speed of the second component is proportional to the rotational speed of the first component.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system for controlling a powertrain system of a vehicle, the powertrain system comprising an internal combustion engine connectable to one or more drive wheels, the computer system comprising processing circuitry configured to selectively operate the powertrain system in a number of operational modes comprising at least a freewheeling mode, in which an output shaft of the engine is non-rotating and the engine is disconnected from the one or more drive wheels, wherein the processing circuitry is further configured to:

determine an opportunity for the freewheeling mode by predicting a feasibility of restarting the engine along an intended route by using a controllable clutch;

wherein predicting the feasibility of restarting the engine by using the controllable clutch comprises determining a fulfillment of any one of a first restarting condition and a second restarting condition;

wherein determining fulfillment of the first restarting condition comprises comparing a current total weight of the vehicle with a threshold value indicative of a minimum total weight for avoiding excessive braking of the vehicle during restarting at a high friction road condition with a given total gear ratio, wherein determining fulfillment of the second restarting condition comprises comparing a current drive axle load with a corresponding threshold value indicative of a minimum drive axle load on a drive axle for avoiding excessive wheel slip during restarting at a low friction road condition with a given total gear ratio; and control the powertrain system into the freewheeling mode upon the determined fulfillment of any one of the first restarting condition and the second restarting condition.

2. Computer system according to claim 1, wherein the processing circuitry is configured to control the powertrain system into the freewheeling mode by changing a rotating state of the output shaft to a non-rotating state, and disconnecting the engine from the one or more drive wheels.

3. Computer system according to claim 1 or, wherein the processing circuitry is further configured to initiate an activation of the freewheeling mode based on topography data and vehicle data.

4. Computer system according to claim 1, wherein the processing circuitry is further configured to determine a starting point in time for the freewheeling mode based on topography data and vehicle data.

5. Computer system according to claim 1, wherein the processing circuitry is configured to determine the given total gear ratio by predicting which gear is to be engaged at the moment of engine restart.

6. Computer system according to claim 1, wherein the processing circuitry is configured to determine fulfillment of the first restarting condition by determining that the total weight of the vehicle meets, or exceeds, the threshold value.

7. Computer system according to claim 1, wherein the processing circuitry is configured to determine fulfillment of the second restarting condition by determining that the current drive axle load meets, or exceeds, the corresponding threshold value.

8. Computer system according to claim 1, wherein the processing circuitry is configured to determine non-fulfillment of the first restarting condition and second restarting conditions, respectively, and upon the determined non-fulfillment of the first restarting condition and the second restarting conditions, further determine to avoid, or postpone, controlling the powertrain system into the freewheeling mode.

9. Computer system according to claim 1, wherein the processing circuitry is configured to determine non-fulfillment of the first restarting condition and the second restarting condition, respectively, and upon the determined non-fulfillment of the first restarting condition and the second restarting condition, further determine to restart the engine along the intended route by using a starter motor rather than the controllable clutch, and control the powertrain system into the freewheeling mode.

10. Computer system according to claim 1, wherein the processing circuitry is configured to predict the feasibility of restarting the engine by using the controllable clutch by determining fulfillment of both the first restarting condition and the second restarting condition, and further configured to control the powertrain system into the freewheeling mode upon fulfillment of both the first restarting condition and the second restarting condition.

11. A powertrain system comprising a computer system according to claim 1, the internal combustion engine, the controllable clutch, a transmission arranged to be coupled to the internal combustion engine by means of the controllable clutch, and wherein the transmission further comprises an output shaft configured to be coupled to a driven axle of a set of wheels.

12. A vehicle comprising the computer system of claim 1 and the powertrain system.

13. A computer-implemented method for controlling a powertrain system of a vehicle, the powertrain system comprising an internal combustion engine connectable to one or more drive wheels, the powertrain system being operable in a number of operational modes, including at least a freewheeling mode, in which an output shaft of the engine is non-rotating, and the engine is disconnected from the one or more drive wheels, wherein the method comprises determining an opportunity for the freewheeling mode by predicting a feasibility of restarting the engine along an intended route by using a controllable clutch, wherein predicting the feasibility of restarting the engine by using the controllable clutch comprises determining fulfillment of any one of a first restarting condition and a second restarting condition, wherein determining fulfillment of the first restarting condition comprises comparing current total weight of the vehicle with a threshold value indicative of a minimum total weight for avoiding excessive braking of the vehicle during restarting at a high friction road condition with a given total gear ratio, wherein determining fulfillment of the second restarting condition comprises comparing a current drive axle load with a corresponding threshold value indicative of a minimum drive axle load on a drive axle for avoiding excessive wheel slip during restarting at a low friction road condition with a given total gear ratio; and controlling the powertrain system into the freewheeling mode upon the determined fulfillment of any one of the first restarting condition and the second restarting condition.

14. A non-transitory computer-readable storage medium comprising instructions, which when executed by the processing circuitry, cause the processing circuitry to perform the method of claim 13.

* * * * *